United States Patent
Haidari et al.

(10) Patent No.: US 6,646,826 B1
(45) Date of Patent: Nov. 11, 2003

(54) INTEGRATED COVER AND GASKET ASSEMBLY

(75) Inventors: Mehdi Sattaree Haidari, Eden Prairie, MN (US); Stephen Peter LeClair, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 170 days.

(21) Appl. No.: 09/784,838

(22) Filed: Feb. 16, 2001

Related U.S. Application Data

(60) Provisional application No. 60/183,098, filed on Feb. 17, 2000.

(51) Int. Cl.[7] ............................................... G11B 33/14
(52) U.S. Cl. ..................................................... 360/97.02
(58) Field of Search ...................................... 360/97.02

(56) References Cited

U.S. PATENT DOCUMENTS

| | | | |
|---|---|---|---|
| 4,950,521 A | 8/1990 | Takamura et al. ............. 428/78 |
| 5,147,691 A | 9/1992 | Shimamoto et al. ......... 427/387 |
| 5,326,611 A | 7/1994 | Kishita et al. ................. 428/78 |
| 5,364,676 A | 11/1994 | Takago et al. ............. 428/35.7 |
| 5,422,766 A | 6/1995 | Hack et al. .............. 360/97.02 |
| 5,696,648 A | 12/1997 | Jeong et al. ............. 360/97.02 |
| 5,703,734 A | 12/1997 | Berberich et al. ....... 360/97.02 |
| 5,793,566 A | 8/1998 | Scura et al. ............. 360/97.02 |
| 5,825,585 A | 10/1998 | Hatam-Tabrizi ......... 360/97.02 |
| 5,882,729 A | 3/1999 | Kahl et al. ................... 427/265 |
| 5,945,463 A | 8/1999 | Kawabuchi et al. .......... 522/96 |
| 6,128,159 A | * 10/2000 | Ino ........................ 360/97.02 |

* cited by examiner

Primary Examiner—A. J. Heinz
(74) Attorney, Agent, or Firm—Jennifer M. Buenzou

(57) ABSTRACT

A disc drive includes a base and a disc rotatably attached to the base. The disc drive also includes an actuator assembly rotatably attached to said base and a device for moving the actuator assembly. A cover is attached to the base. The combination of the cover and base form a disc enclosure for enclosing the disc the actuator assembly and the device for moving the actuator assembly. The cover includes a first layer having a rubber gasket attached thereto, a second layer, and a third layer of damping material positioned between the first layer and second layer. The gasket may be attached to the cover. The gasket may also be formed integral with the cover. The cover reduces relative motion between the actuator assembly and the base while under any type of servo control that requires corrections to be implemented with the voice coil motor. The disc drive may also include a base having first and second layers of stainless steel, a rubber gasket attached to the first layer, and a layer of damping material between the first and second layers.

17 Claims, 7 Drawing Sheets

INTEGRATED COVER AND GASKET ASSEMBLY

RELATED APPLICATIONS

This application claims the benefit of U.S. Provisional Application No. 60/183,098 filed Feb. 17, 2000 under 35 U.S.C. 119(e).

FIELD OF THE INVENTION

The present invention relates to generally to disc drive assemblies. More particularly, this invention relates to an integrated cover and gasket assembly for sealing a disc drive housing.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also 25 referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the 10 storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

When, however, electricity is applied to the voice coil to generate a drive force to relocate the transducer attached to the rotary actuator assembly, the permanent magnet and yoke are subjected to the resulting reaction force. The permanent magnet and yoke are attached to the base of the disc drive. The reaction force acts through the permanent magnet and yoke to excite the base. Simply put, the base is vibrated when the voice coil is used to move the actuator and transducers during a seek operation. As a result during positioning, there occurs a relative displacement between the transducer supported by the actuator assembly and the track on the disc. This causes the transducer to move off-track. In addition, access times to data can increase. At the end of a seek, the transducer must settle to a position over a track. If the disc and attached base are vibrating, the track below the transducer may be moving thereby preventing the transducer from "settling". As a result, the time required for positioning increases, thereby affecting positioning performance such as access time. Tracks are becoming narrower and narrower as tracks are being placed closer and closer together. The problems of settle time are also exacerbated by the decreased widths.

After a seek, the disc drive may be commanded to write data to a track. If the transducer is vibrating or moving beyond a selected limit, then a write fault is declared to prevent overwriting or corruption of an adjacent track. The selected limit may be called a write fault threshold or can also be referred to as an on cylinder limit. As tracks get narrower and narrower, it becomes increasingly more important to reduce the relative movement between the track on the disc and the transducer to lessen the chance of read errors or write faults. In most cases, when a write fault occurs, the actuator remains on track until the transducer is repositioned over the proper sector. The actuator remains on track for at least one revolution. When the transducer is again positioned over the proper sector, a write can occur provided that the actuator is within the write fault threshold. If not within the write fault threshold at the target time, the procedure of waiting on track and retrying a write is repeated either for a selected number of revolutions until the actuator is within the write fault threshold at the target time. Then a write can occur. Low levels of write fault errors are tolerable or acceptable. However, when too many write faults occur over a given amount of time, the performance of the disc drive degrades. In summary, when an excessive number of write fault errors are encountered over a given amount of time, the average seek time degrades significantly.

In the past, several approaches have been used to try and minimize the movement of the base as it reacts to the driving force produced by the voice coil motor. These approaches use dynamic weights. In other words, the weights move significantly with respect to the disc drive base. Such approaches can also have problems. There is always a distinct possibility that the movement may cease over time. In other words, the rings or weights or corner weight may become stuck. The result is that all of the sudden a disc drive may begin to produce large numbers of read and write errors. The disc drive, simply put, would be less reliable. There is also a chance that there may be particles generated from two parts rubbing whenever one part is moving with respect to another. Such particles can cause disc crashes when they are within the disc enclosure.

Quick and precise positioning requires the reduction of the vibration of the magnetic disc apparatus caused by the driving reaction force to the voice coil motor.

In either case, the head positioner assembly is adapted to rapidly and precisely position the heads relative to the magnetic discs. Rapid movement of the various components, including the rotating spindle motor, the head positioner assembly, and the discs themselves tends to generate a wide variety of undesirable acoustic vibrations within the disc drive.

A primary source of acoustical emissions from a disc drive is the amplification of these vibrations and especially of the spindle motor vibration by the top cover and the base of the disc drive. One method of reducing the amplification of the cover is to add damping directly to the cover. Past tests have considered applying a constrain damping layer material to an existing cover. This approach was not successful unless the material was a lead sheet, which is environmentally toxic and expensive.

What is needed is a disc drive which has is less susceptible to the reaction forces. This will improve settling characteristics after a seek from a first track on the disc to a target track on the disc and will improve track following operations of the disc drive. In other words, there is a need for a disc drive that has less relative motion between the actuator assembly and the base while under any type of servo control that requires corrections to be implemented with the voice coil motor. There is also a need for a static solution so that the resulting disc drive is more reliable over the life of the drive. Also needed is a device that can be assembled using current assembly techniques.

SUMMARY OF THE INVENTION

The inventive disc drive includes a base and a disc rotatably attached to the base. The disc drive also includes an actuator assembly rotatably attached to said base and a device, such as a voice coil motor, for moving the actuator assembly. A cover is attached to the base. The combination of the cover and the base form a disc enclosure for enclosing the disc, the actuator assembly and the voice coil motor. The cover includes two layers, a first interior layer including a rubber gasket molded thereto, a second layer, and a thin layer of damping material sandwiched between at least a portion of the two layers. The rubber gasket is molded to the first layer, the first layer being bonded to the second layer using damping materials already used on existing covers. The first and second layers may be made of metal, such as steel, stainless steel or aluminum for example. The stainless steel layers can be made or stamped out of stainless steel. Addition of the cover to the disc drive during manufacture can easily be accommodated using current assembly techniques. The cover is easily assembled and incorporated into a disc drive without additional expense from materials and manufacturing steps. The cover reduces relative motion between the actuator assembly and the base while under any type of servo control that requires corrections to be implemented with the voice coil motor. The disc drive may also include a base having the same construction.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
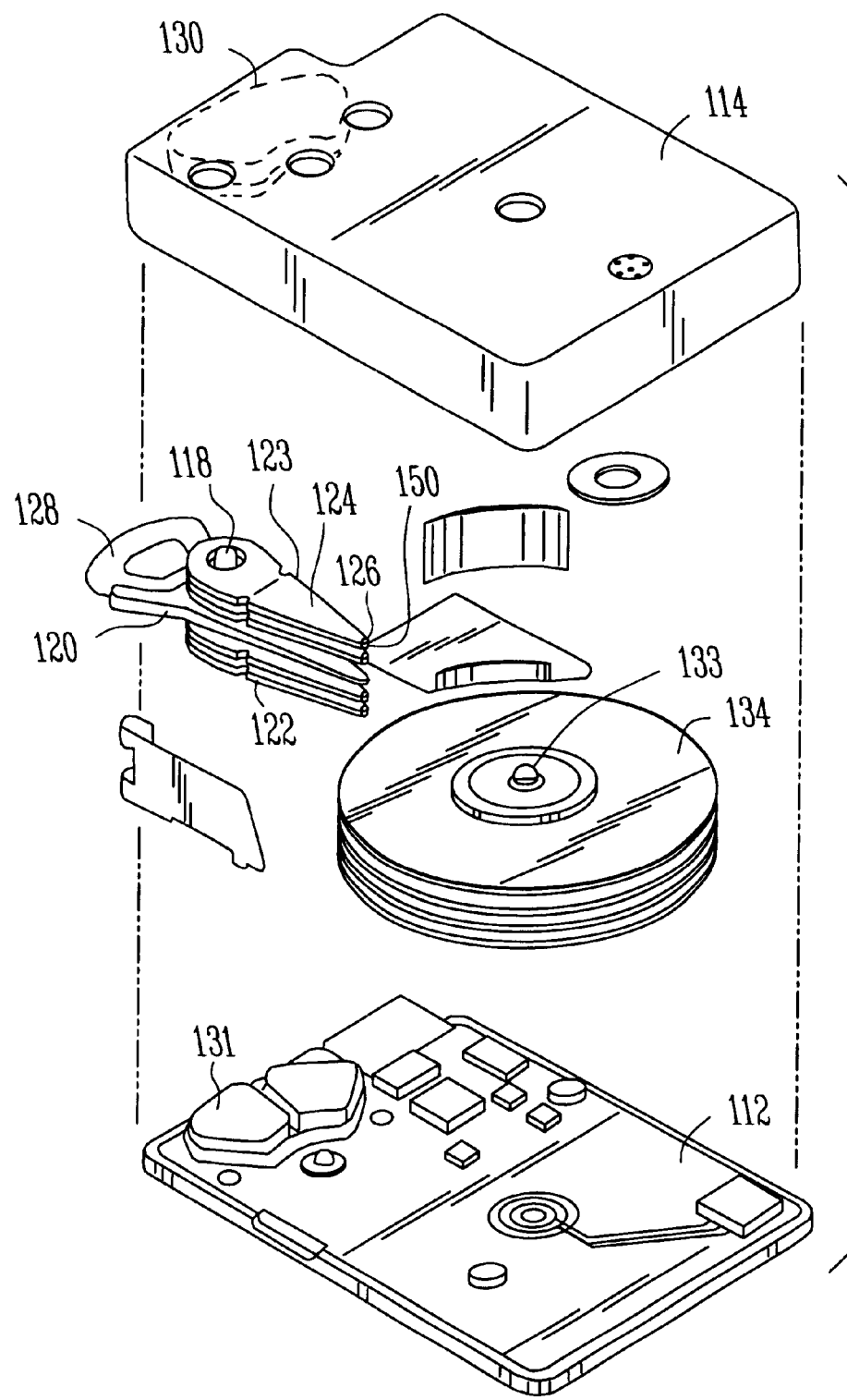
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drive. FIG. 1 is an exploded view of one type of a disc drive 100 having a rotary actuator. The disc drive 100 includes a housing or base 112, and a cover 114.

Figure 2:
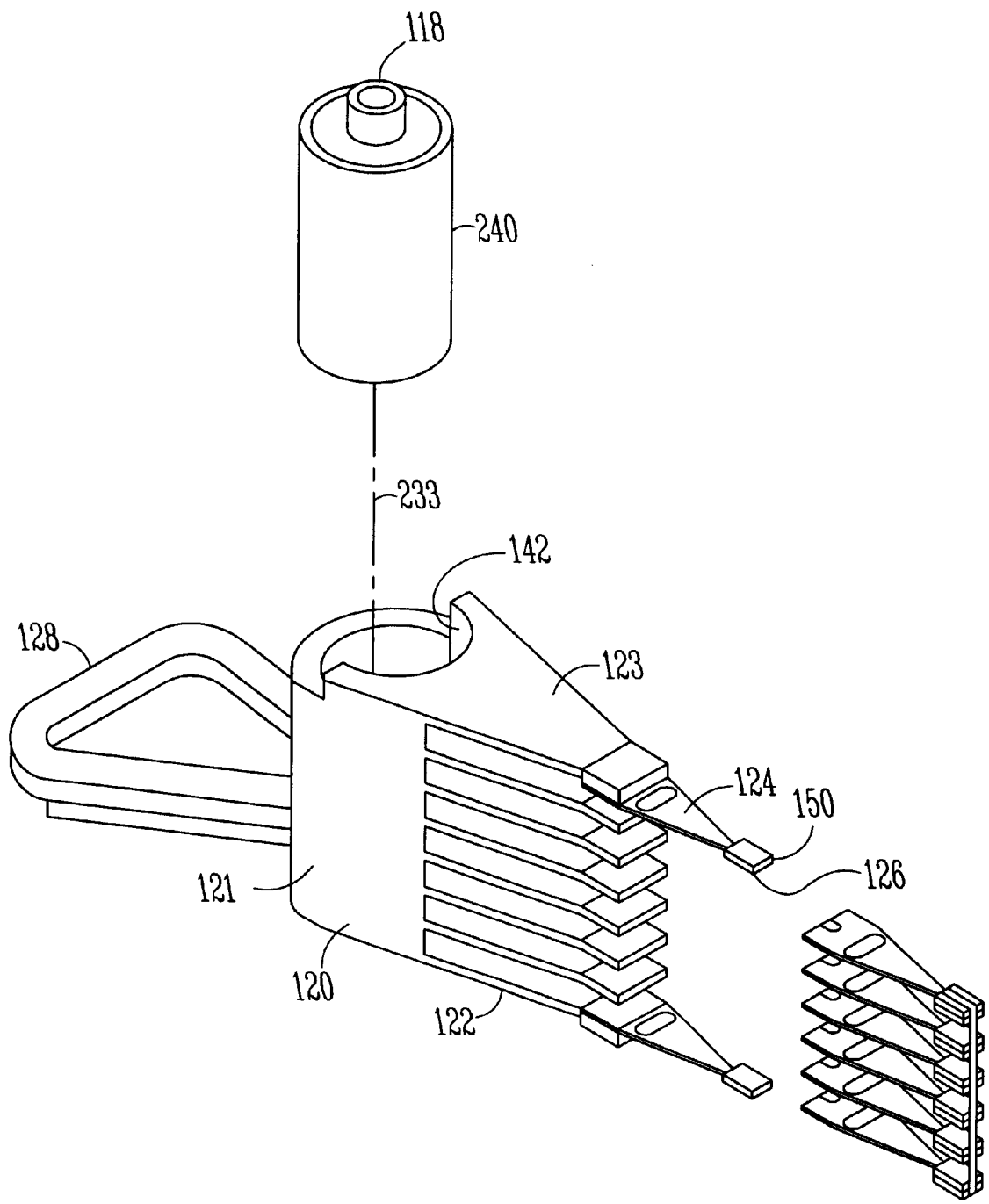
FIG. 2 is an exploded view of the actuator bearing cartridge and the actuator arm assembly of a disc drive.

Rotatably attached to the base 112 on an actuator shaft 118 is an actuator assembly 120. Referring to FIGS. 1 and 2, the actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

The base 112 and cover 114 form a disc enclosure. The head disc enclosure is the controlled environment that results from the cover 114 being placed on the base 112. Generally, the disc or discs 134, the actuator assembly 120 and the voice coil motor are positioned within the head disc enclosure. The head disc enclosure is generally sealed and may or may not have a breather filter into which make-up air can be obtained for the head disc enclosure.

FIG. 2 details the actuator arm assembly 120 in an exploded view. Each of the arms 123 of the E block or comb assembly 122, except the arms 123 on the top and bottom of the E block 122, carry two load springs. In this particular disc drive 100, there is a slider for both the top and bottom fingers of the E block 122 have only one load spring 124 since these are used for the top surface of the top disc and the bottom surface of the bottom disc in the stack of discs 134. Attached to the load springs 124 are sliders 126 which include magnetic transducers which magnetize the surface of the disc 134 to represent and store desired data. As is well known in the art of disc drives, each of the discs has a series of concentric tracks onto which the magnetic information is recorded. The sliders 126 and the magnetic transducers incorporated therein moved over the surface of a particular disc 134 so that a magnetic representation of data can be stored in any of the tracks on the disc 134. In this particular disc drive 100, the transducer movement is rotational and about the actuator shaft 118. Rotating the actuator arm assembly 120 causes the slider 126 and the transducer therein to be repositioned over surface of the disc 134.

FIG. 2 also shows that the actuator arm assembly 120 includes a bearing cartridge 240. The bearing cartridge is cylindrical in shape and includes the actuator shaft 118 about which the actuator arm assembly rotates. The actuator arm assembly 120 has a first opening or bore 142 therein. The bearing cartridge 240 fits within the bore 142 in the actuator arm assembly 120.

Figure 3:
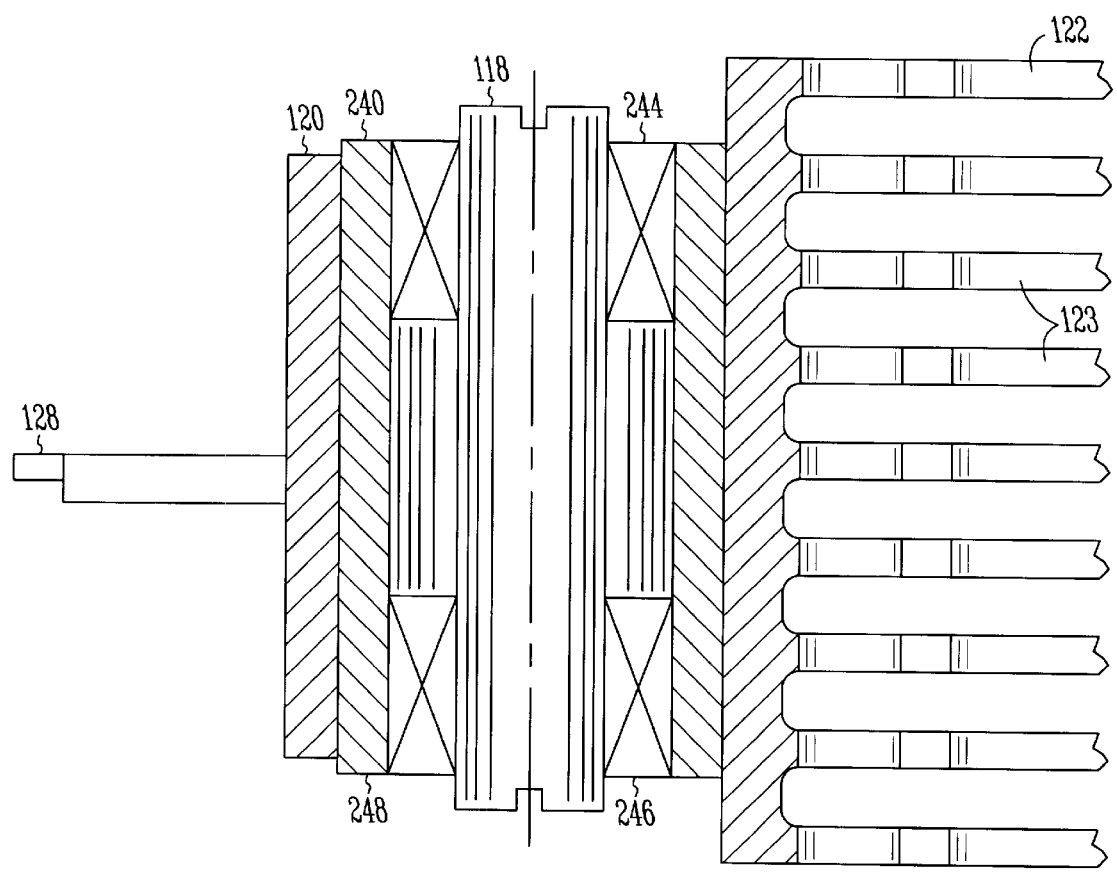
FIG. 3 is a sectional view of the actuator bearing cartridge and the actuator arm assembly of a disc drive.

FIG. 3 further details the bearing cartridge 240 and its attachment to the actuator arm assembly 120. The bearing cartridge 240 is comprised of a first bearing set 244, a second bearing set 246, an outer sleeve 248 and the shaft 118. The actuator shaft 118, the first bearing set 244, the second bearing set 246 and the outer sleeve 248 are made of the same material so that when the bearing cartridge 240 is heated during the operation of the disc drive 100, all of the components have the same coefficient of thermal expansion.

Figure 4:
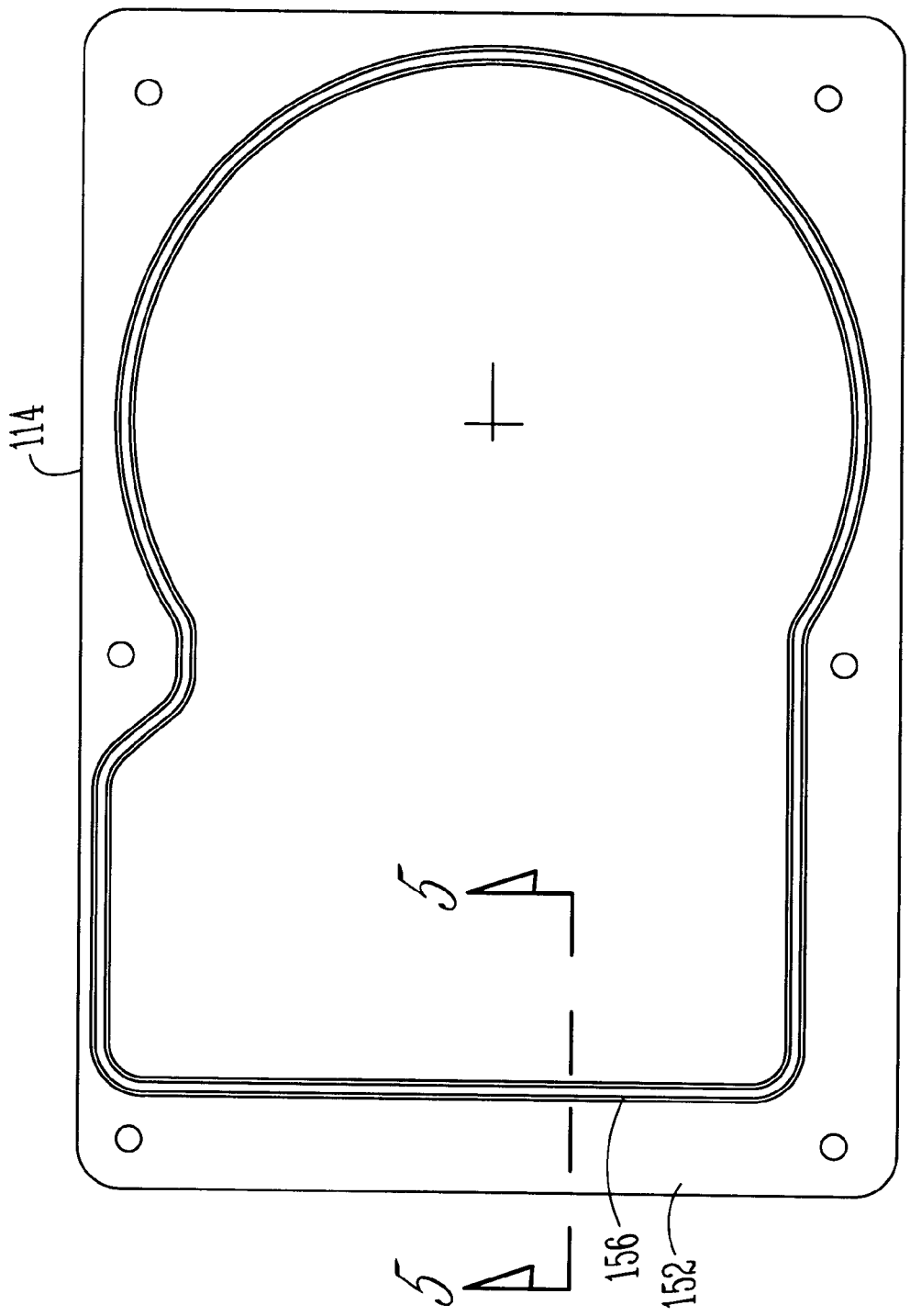
FIG. 4 is a top diagrammatic view of the cover of the disc drive.

FIG. 4 is a diagrammatic view of cover 114 of disc drive 100. Cover 114 includes a first interior layer 152 and a second layer 154. The layers 152, 154 may be made of metal, such as steel, stainless steel or aluminum, for example. In one embodiment, layers 152, 154 can be made or stamped out of stainless steel. In one embodiment, the stainless steel is 302/304. One of the layers, a first or interior layer 152, includes a rubber gasket 156 molded thereto. Rubber gasket 156 may be made of Silicone, Butyl, Neoprene or other Hydrocarbon compounds. In one embodiment, gasket 156 may be made of a fluorocarbon compound. In one embodiment, gasket 156 may be made of a fluoroelastomer. In one embodiment, gasket 156 is made of Dyneon, commercially available from Dyneon LLC of Oakdale, Minn. In one embodiment, the rubber gasket 156 is metalized, and is integral with the first layer of stainless steel 152. Interior layer 152 includes two raised portions 160, 162 defining a space or channel 164 therebetween, which is "plugged" by gasket 156, and retains gasket 156. In one embodiment, channel 164 and gasket 156 are positioned near the periphery of first layer 152.

Figure 5:
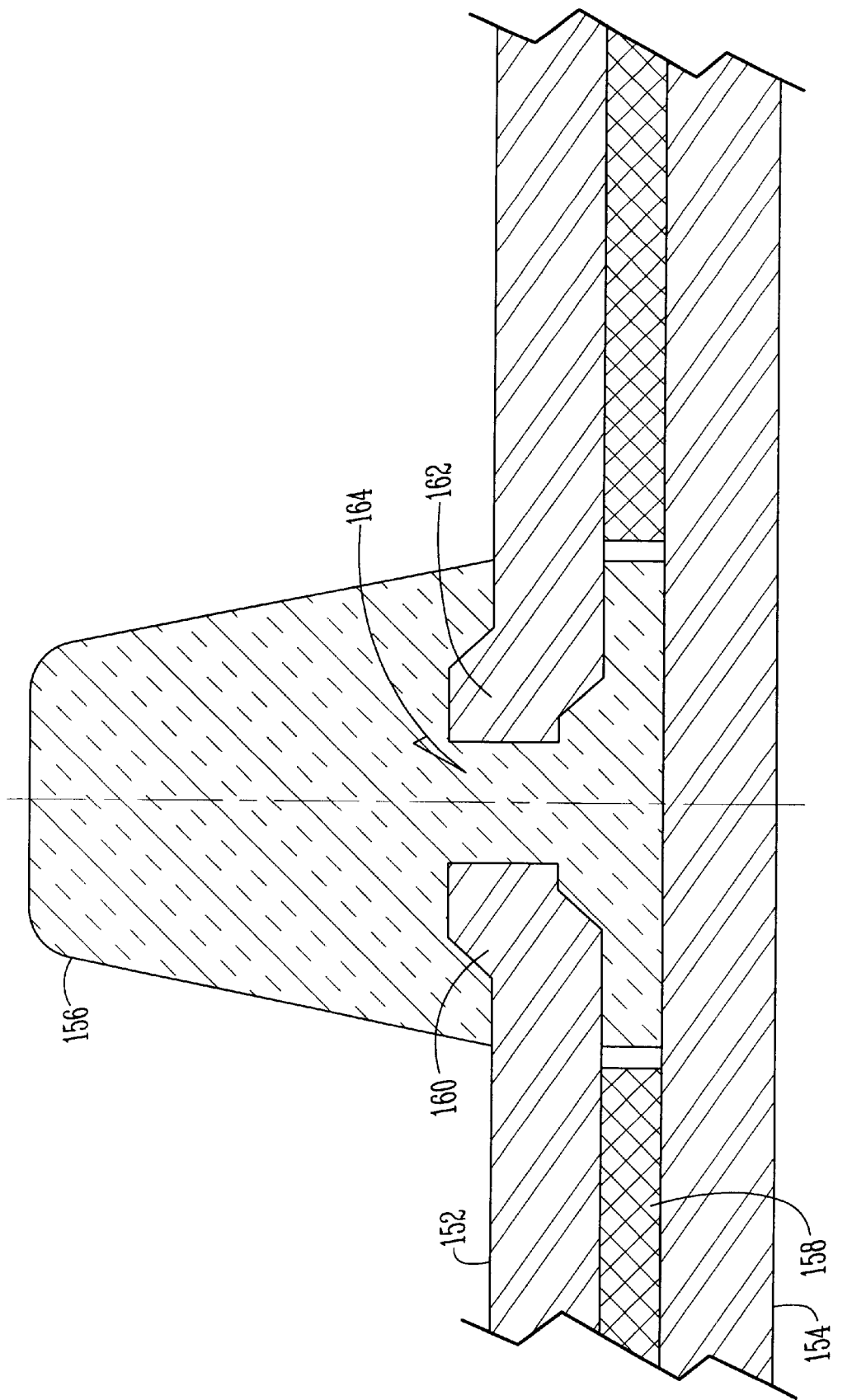
FIG. 5 is an enlarged sectional view along line 5—5 of FIG. 4.

Referring to FIG. 5, an enlarged cross sectional view along line 5—5 of FIG. 4, a third layer 158, of damping material is sandwiched between at least a portion of the two layers. In one embodiment, first layer 152 is bonded to second layer 154 by damping material 158. In one embodiment, the dampening material is a 3M Viscoelastic Polymer commercially available from 3M of St. Paul, Minn. The dampening material can be an adhesive having dampening characteristics or a viscoelastic tape. Damping material 158 may be a damping material already used on existing covers. Using a dampening material such as viscoelastic tape, results in better performance in terms of write errors. Addition of the cover to the disc drive during manufacture can easily be accommodated using current assembly techniques. The cover is easily assembled and incorporated into a disc drive without additional expense from materials and manufacturing steps.

Figure 6:
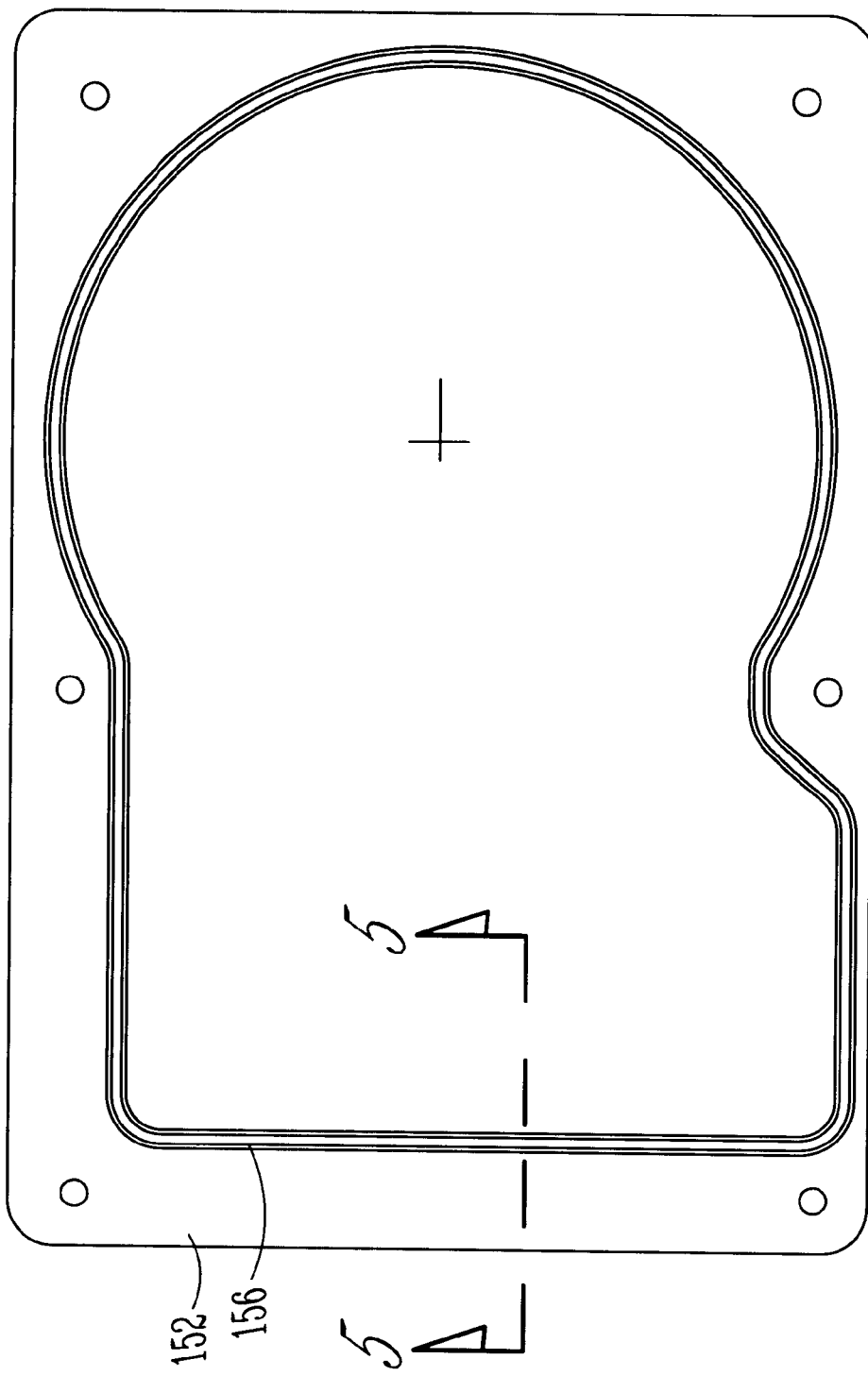
FIG. 6 is a top diagrammatic view of the base of the disc drive.

Referring to FIGS. 5 and 6, the disc drive 100 may also include a base 112 having the same construction.

Figure 7:
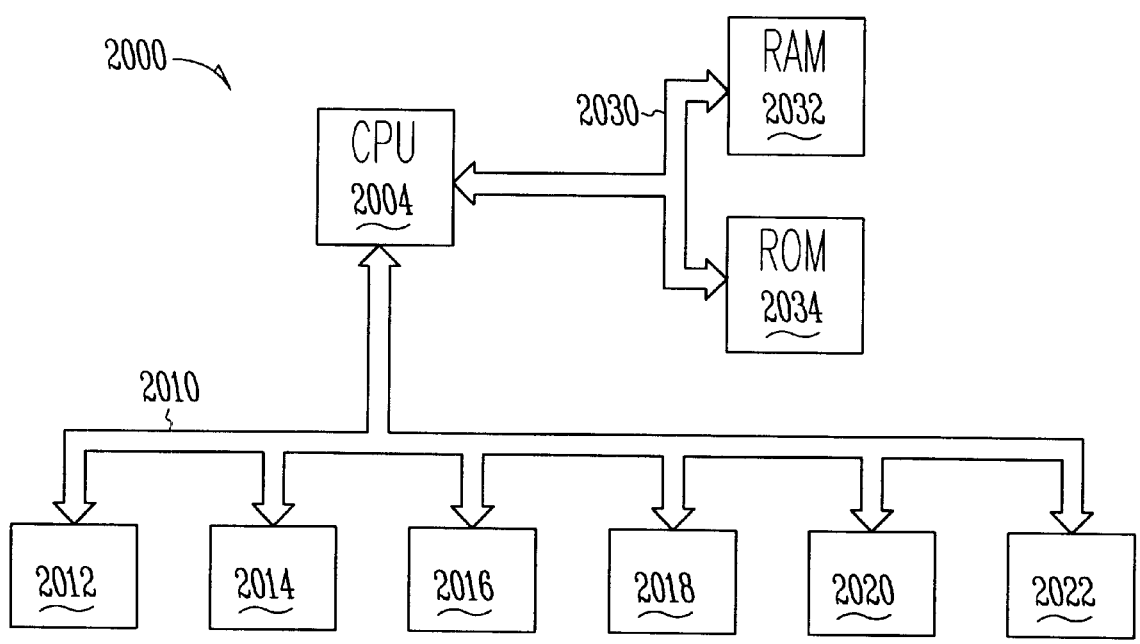
FIG. 7 is a schematic view of a computer system.

FIG. 7 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a disc drive 100 includes a base 112, a cover 114 and an actuator 120 rotatably attached to the base 112. The actuator 120 having a first end and a second end. A voice call 128 is attached to one end of the actuator 120. A transducer 150 is attached to the other end of the actuator 120. A magnet 130, 131 is attached to the base 120. The magnet 130, 131 and voice coil 128 form a voice coil motor for driving the actuator 120. Cover 114 includes a first or interior layer 152 and a second exterior layer 154. In one embodiment, first and second layers are made of a metal, such as steel, stainless steel or aluminum, for example. Interior layer 152, includes a rubber gasket 156 molded thereto. Gasket 156 is positioned near the periphery of layer 152. A third layer 158, of damping material is sandwiched between at least a portion of the two layers. In one embodiment, first layer 152 is bonded to second layer 154 by damping material 158.

A disc drive 100 includes a base 112 and a disc 134 rotatably attached to the base 112. The disc drive also includes an actuator assembly 120 rotatably attached to said base 112 and a device 128, 130, 131 for moving the 20 actuator assembly. A cover 114 is attached to the base 112. The combination of the cover 114 and base 112 form a disc enclosure 112, 114 for enclosing the disc 134, the actuator assembly 120 and the device for moving the actuator assembly 120. The cover 114 includes a first layer 152 having a rubber gasket 156 attached thereto, a second layer 154 and a third layer of damping material 158 positioned between first layer 152 and second layer 154, first and second layers 152, 154 being bonded by damping material 158.

In general, the inventive disc drive 100 includes a head disc enclosure, and a cover including a first interior layer having a rubber gasket molded thereto, and a second layer, the first and second layers being bonded by a damping material.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
   a base;
   an actuator rotatably attached to the base; and
   a cover comprising:
      a first layer having a gasket attached thereto, the gasket further retained in a space between two raised portions of the first layer, the gasket extending along a portion of a periphery of the cover;
      a second layer; and
      a third layer of damping material positioned between the first layer and second layer.

2. The disc drive of claim 1 wherein the first layer and second layer of the cover are made of metal.

3. The disc drive of claim 2 wherein the first layer and the second layer are made of stainless steel.

4. The disc drive of claim 2 wherein the first layer and the second layer are made of aluminum.

5. The disc drive of claim 1 wherein the gasket is formed integral with the cover.

6. The disc drive of claim 1 wherein the gasket is made of Dyneon.

7. The disc drive of claim 1 wherein the third layer is a damping polymer.

8. The disc drive of claim 1 wherein the third layer is viscoelastic tape.

9. The disc drive of claim 1 wherein the base comprises a first layer of having a gasket attached thereto, a second layer and a third layer of damping material positioned between the first layer and second layer.

10. The disc drive of claim 9 wherein the first layer and the second layer of the base are made of metal.

11. The disc drive of claim 9 wherein the first layer and the second layer are made of stainless steel.

12. The disc drive of claim 1 wherein the gasket extends along the entire periphery of the cover.

13. A disc drive comprising:
   a base;
   a disc rotatably attached to the base;
   an actuator assembly rotatably attached to the base; and
   a cover attached to the base, the cover and base forming a disc enclosure for enclosing the disc, the cover comprising a first interior layer having a gasket attached thereto that is retained in a space defined by two raised portions in the first interior layer, the gasket-extending along a portion of a periphery of the cover, a second exterior layer of the same material as the first layer, and a third layer of damping material positioned between the first layer and the second layer.

14. The disc drive of claim 13 wherein the first layer and the second layer of the cover are made of material.

15. The disc drive of claim 13 wherein the first layer and the second layer of the cover are made of stainless steel.

16. The disc drive of claim 13 wherein the gasket extends along the entire periphery of the cover.

17. A disc drive comprising:
   a base;
   a disc rotatably attached to the base;
   an actuator assembly rotatably attached to the base;
   a device for moving the actuator assembly; and
   means for covering and sealing the base, characterized by a cover comprising opposing raised portions and a gasket retained between the opposing raised portions to form a disc enclosure.

* * * * *